United States Patent Office 3,634,490
Patented Jan. 11, 1972

3,634,490
N-(SUBSTITUTED-PHENACYL)CARBAMATES
Albert A. Carr, —r., and Donald R. Meyer, Cincinnati, Ohio, assignors to Richardson-Merrell Inc., New York, N.Y.
No Drawing. Filed June 27, 1969, Ser. No. 837,370
Int. Cl. C07c 125/06
U.S. Cl. 260—471 C          14 Claims

ABSTRACT OF THE DISCLOSURE

Novel compounds selected from the formula

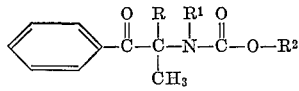

wherein: R is hydrogen or methyl; $R^1$ is hydrogen methyl, ethyl, or isopropyl; and $R^2$ is (lower)alkyl or benzyl. These compounds are appetite depressants.

---

This invention relates to novel N-(substituted-phenacyl)carbamates. More particularly this invention relates to novel N-(substituted-phenacyl)carbamates which, when administered orally, cause a marked reduction in the appetite.

The compounds of the present invention can be represented by the following formula

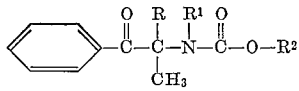

wherein: R is hydrogen or methyl; $R^1$ is hydrogen, methyl, ethyl, or isopropyl; and $R^2$ is (lower)alkyl or benzyl. The term (lower)alkyl refers to alkyls having from 1 to 4 carbon atoms, e.g., methyl, ethyl, propyl, isopropyl, butyl, secondary butyl, and the like.

To applicants' knowledge, the compounds of this invention are novel. Compounds most closely related to those of the instant invention compounds appear to be those of ethyl N-(phenacyl)carbamate and ethyl N-methyl-N-(phenacyl)carbamate. References to the synthesis of the former compound can be found in C. Mannich and F. Hahn, Ber. 44, 1542–1552 (1911) and K. Slotta and H. Heller, Ber. 63B, 1024–8 (1930). The synthesis of the latter compound is shown by K. Hess and Cl. Uibrig, Ber. 48, 1974–1985 (1915). These two prior art compounds were tested by applicants for appetite depressant activity. Neither of these prior art compounds showed useful anorexic potency in rats at 15 mg./kg. and in mice at 100 mg./kg. of body weight. Additional prior art compounds, which do not appear to be as closely related to those of applicants as the above two compounds, include ethyl N-(α,α-dimethyl-p-chlorophenethyl)carbamate which is described by E. Sandrin and R. Boissonnas, Helv. Chim. Acta 49, 76–82 (1965) and (lower)alkyl N - [α,α-dimethyl-β-(dichlorophenyl)ethyl] carbamates which are described in German Patent 1,248,033 which was published on Aug. 24, 1967.

The compounds of the present invention can be used alone for their appetite depressant effects, but preferably they are used together with conventional solid or liquid pharmaceutical carriers suitable for oral administration. The term "pharmaceutical carrier," as used herein, is meant to include the usual pharmaceutical carrier, filler substances and additives suitable for oral administration such as the starches, e.g., rice starch, corn starch, potato starch, wheat starch, and the like; milk sugar; dextrose; mannitol; talcum; lactalbumun; alginates; magnesium stearate; and the like. Further, the compounds of the instant invention can be formulated with food supplements, e.g., vitamins and minerals, e.g., potassium iodide, magnesium sulfate, and the like. Such food supplements can be considered pharmaceutical carriers.

The compounds of this invention can be administered in doses providing from about 0.5 to 50 milligrams per kilogram of animal body weight per day and preferably from about 1 to 30 mg./kg. of animal body weight per day. Unit doses of these compounds together with a significant quantity of a pharmaceutical carrier can contain from about 5 to 250 mg. of the appetite depressant and preferably from about 10 to 100 mg. of the appetite depressant. The quantity of pharmaceutical carrier can vary, as is conventional in the art, for the preparation of unit dosage forms, e.g., tablets, dragees, capsules, solutions, emulsions, and the like.

The appetite depressants of this invention have minimal effects insofar as raising the blood pressure of animals and exhibit a protracted duration of anorexic activity. These compounds also lack the undesirable CNS stimulant properties of the amphetamines commonly used for appetite suppression. The compounds of this invention can be administered to warm-blooded animals, e.g., mammals, one or more times a day, preferably three times a day about one hour before each meal.

Two general methods which can be used to prepare the compounds of this invention are shown below wherein R, $R^1$ and $R^2$ have the meanings given hereinbefore.

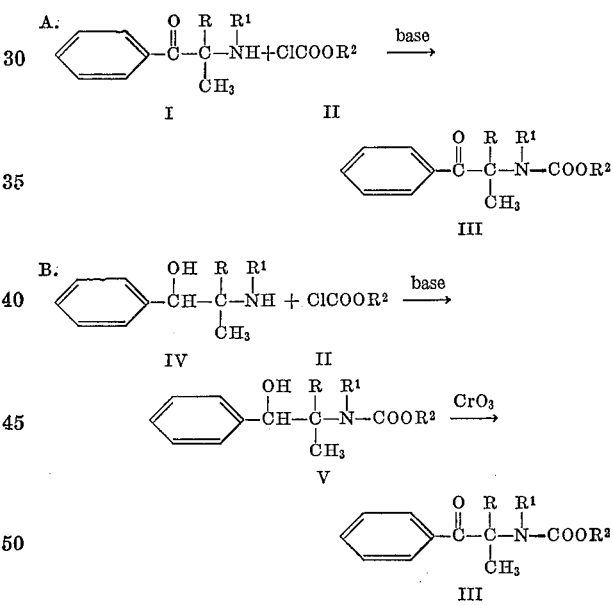

Where the aminoalcohols are readily available, method B appears to be the preferred route. It is also the more advantageous method when the product, III, obtained is asymmetric and retention of configuration of an optical isomer is desired. This occurs where R is other than $CH_3$. For example, when R=H, then the preparation of compounds of general Formula III, via compounds of general Formula V, is preferred. This preference is due to the relative optical instability of compounds of general Formula I (where R is H) especially in the presence of aqueous base. The intermediate compounds of Formula V are usually prepared in good yield and should be used without distillation (if a liquid) due to the possibility of thermal cyclization under conditions of elevated temperature.

The starting aminoketone compounds used in the following Examples 1 and 8 (2-ethylaminopropiophenone) and Examples 7 and 11 (2-methylaminopropiophenone), are known compounds which, together with their method of preparation, are reported in Hyde et al., J. Am. Chem.

Soc. 50, 2287 (1928). The 2-aminopropiophenone used in Examples 2 and 9 is a known compound. Reference to this compound can be found in J. Het. Chem. 1, 72, (1964). This compound can also be prepared by the chromic acid oxidation of norephedrine in a manner similar to that for the oxidation of ephedrine which is reported in German Pat. 1,129,504. This latter method was used for the preparation of $l$ - 2 - methylaminopropiophenone, used in Example 4.

The starting 2-amino-2-methylpropiophenone used in Example 3, together with its method of preparation, is given by Parcell in Chem. and Ind. (London) 1963, 1396.

The starting compounds for Examples 5 and 6, $d$- and $l$-ethyl N - ($\beta$-hydroxy-$\alpha$-methylphenethyl)-N-methylcarbamate, respectively, are described in Collection Czechoslav. Chem. Communs. 13, 316 (1948); CA 42, 8190, but without reference to their rotational properties. The $l$-ephedrine and $l$-pseudoephedrine can also be converted to the carbamate derivatives, used as starting materials in Examples 5 and 6, by reaction with ethyl chloroformate.

The compound, 2 - (methylamino)isobutyrophenone used in Examples 10 and 12 and 2-(ethylamino)isobutyrophenone used in Example 13, or their method of preparation, are disclosed in U.S. Pat. 3,082,255, British Pat. 867,776 and in Stevens et al., J. Org. Chem. 27, 4392, (1962).

The following examples are illustrative of the invention.

EXAMPLE 1

Preparation of ethyl N-ethyl - N - ($\alpha$-methylphenacyl) carbamate

To a solution of 21.37 g. (0.1 M) of 2-(ethylamino) propiophenone hydrochloride in 100 ml. of water, stirred in an ice bath, was added 200 ml. of a 15% sodium carbonate solution. To this stirred mixture was added 21.8 g. (0.2 M) of ethyl chloroformate keeping the temperature of the reaction mixture of 10–15°. After stirring 15 minutes, the reaction mixture was extracted three times with ether. The extracts were washed with dilute HCl, then with water and were dried ($MgSO_4$), filtered and the filtrate concentrated to an oil on the steam bath at reduced pressure. The residue was fractionated through a spinning band column to give 21.8 g. (89%) of ethyl N-ethyl-N-($\alpha$-methylphenacyl)carbamate, B.P. 94–95° (0.007 mm.).

EXAMPLE 2

Preparation of ethyl N - ($\alpha$-methylphenacyl)carbamate

Following the general procedure of Example 1, 13.2 g. (0.07 M) of 2-aminopropiophenone hydrochloride was reacted with 25 g. (0.23 M) of ethyl chloroformate in the presence of aqueous sodium carbonate to give 10.4 g. (71.6%) of ethyl N-($\alpha$-methylphenacyl)carbamate M.P. 39–40° after purification from pentane.

EXAMPLE 3

Preparation of ethyl N-($\alpha,\alpha$-dimethylphenacyl)carbamate

Following the general procedure of Example 1, 17.05 g. (0.086 M) of 2 - aminoisobutyrophenone hydrochloride was reacted with 25.0 g. (0.23 M) of ethyl chloroformate in aqueous sodium carbonate to give 17.2 g. (86%) of ethyl N-($\alpha,\alpha$-dimethylphenacyl)carbamate, M.P. 83–84° from heptane.

EXAMPLE 4

Preparation of $l$-ethyl N - methyl-N-($\alpha$-methylphenacyl) carbamate

To a stirred solution of 34.0 g. (0.17 M) of $l$-2-(methylamino)propiophenone hydrochloride in 200 ml. of water, cooled in an ice bath, was added 200 ml. of 15% sodium carbonate solution. This mixture was then treated with 30.0 g. (0.28 M) of ethyl chloroformate and stirred for 15 minutes. The reaction mixture was then extracted with three 100 ml. portions of ether and the extracts dried ($MgSO_4$). The ether solution was filtered and concentrated to an oil at reduced pressure on a steam bath. The residual oil was fractionated through a spinning band column to give 17.4 g. (43.4%) of $l$-ethyl N-methyl-N-($\alpha$-methylphenacyl)carbamate, B.P. 94–94.5° (0.01 mm.).

EXAMPLE 5

Preparation of $l$-ethyl N-methyl-N-($\alpha$-methylphenacyl) carbamate

A solution of 47.7 g. (0.21 M) of $d$-ethyl N-($\beta$-hydroxy-$\alpha$-methylphenethyl)-N-methylcarbamate in 400 ml. of acetone (distilled from $KMnO_4$) prepared from the reaction of $l$-ephedrine and ethyl chloroformate in the presence of aqueous sodium carbonate, was cooled to 15° and 107 ml. of a solution prepared from 70 g. of chromic acid in 500 ml. of water and 61 ml. of concentrated $H_2SO_4$ was added dropwise keeping the temperature at 25°. After the addition was complete, the reaction mixture was stirred for five minutes. A saturated solution of sodium bisulfite was added to decompose the excess chromic acid. The acetone solution was decanted from inorganic materials and dried ($MgSO_4$), filtered and concentrated to an oil. This oil was extracted into ether, dried ($MgSO_4$), filtered and concentrated to an oil. This material was fractionated through a spinning band column to give 20.7 g. (43.7%) of $l$-ethyl N-methyl-N-($\alpha$-methylphenacyl) - carbamate, B.P. 100.5° (0.02 mm.). $[\alpha]_D^{25}$ −212.4° (C. 10 dioxane).

EXAMPLE 6

Preparation of $d$-ethyl N-methyl-N-($\alpha$-methylphenacyl) carbamate

A solution of 75.5 g. (0.32 M) of $l$-ethyl-N-($\beta$-hydroxy-$\alpha$-methylphenethyl)-N-methylcarbamate in 840 ml. of acetone was cooled to 5° and stirred while 144 ml. of a solution of 70.0 g. of chromic acid in 500 ml. of water and 61 ml. of concentrated sulfuric acid was added dropwise. The reaction was kept at less than 15° and stirred for an additional five minutes. A small amount of solid sodium bisulfite was added to decompose excess chromic acid. The acetone layer was separated, dried over magnesium sulfate, filtered and the acetone removed on a rotary evaporator. The residue was dissolved in ether and again dried over magnesium sulfate. The ethereal solution was filtered and the solvent removed on a rotary evaporator. The residue was fractionated through a two-foot spinning band column to give 15.2 g. (21.4%) of $d$-ethyl N-methyl-N-($\alpha$-methylphenacyl)-carbamate, B.P. 104° (0.4 mm.). $[\alpha]_D^{25}$ 152.96° (C. 10 ethanol), $n_D^{25.5}$ 1.5114.

The starting $l$-ethyl N-($\beta$-hydroxy-$\alpha$-methylphenethyl)-N-methylcarbamate was prepared by the reaction of $l$-pseudoephedrine with ethyl chloroformate and aqueous sodium carbonate solution.

EXAMPLE 7

Preparation of $dl$-ethyl N-methyl-N-($\alpha$-methylphenacyl) carbamate

Following the method described in Example 1, 44 g. (0.22 M) of $dl$-2-(methylamino)propiophenone hydrochloride was reacted with 39 g. (0.36 M) of ethyl chloroformate in the presence of aqueous sodium carbonate to give 22 g. (41.7%) of $dl$-ethyl N-methyl-N-($\alpha$-methylphenacyl)carbamate, B.P. 99.5–100.5° (0.02 mm.).

EXAMPLE 8

Preparation of methyl N-ethyl-N-($\alpha$-methylphenacyl) carbamate

Following the method described in Example 1, 21.4 g. (0.1 M) of 2-(ethylamino)propiophenone hydrochloride was reacted with 13.0 g. (0.14 M) of methyl chloroformate in the presence of aqueous sodium carbonate solution to give 18.9 g. (80.5%) of methyl N-ethyl-N-($\alpha$-methylphenacyl)carbamate, B.P. 105.5–106° (0.05 mm.).

EXAMPLE 9

Preparation of benzyl N-(α-methylphenacyl)carbamate

Following the general procedure of Example 1, 17.4 g. (0.09 M) of 2-aminopropiophenone hydrochloride was reacted with 25.5 g. (0.15 M) of benzyl chloroformate, in the presence of aqueous sodium carbonate solution to give 19.6 g. (80%) of benzyl N-(α-methylphenacyl)carbamate, M.P. 96.5–97.5°, from diethyl ether.

EXAMPLE 10

Preparation of isopropyl N-(α,α-dimethylphenacyl)-N-methylcarbamate

Following the general procedure of Example 1, 24.3 g. (0.14 M) of 2-(methylamino)isobutyrophenone was reacted with 25 g. (0.20 M) of isopropyl chloroformate to give 22.7 g. (63%) of isopropyl N-(α,α-dimethylphenacyl)-N-methylcarbamate, B.P. 104–105° (0.2 mm.), $n_D^{25}$ 1.5080.

EXAMPLE 11

Preparation of isopropyl N-methyl-N-(α-methylphenacyl) carbamate

Following the general procedure of Example 1, 23.2 g. (0.12 M) of 2-(methylamino)propiophenone hydrochloride was reacted with 24.5 g. (0.2 M) of isopropyl chloroformate to give 19.0 g. (66%) of isopropyl N-methyl-N-(α-methylphenacyl) - carbamate, B.P. 98° (0.2 mm.), $n_D^{25}$ 1.5020.

EXAMPLE 12

Preparation of ethyl N-(α,α-dimethylphenacyl)-N-methylcarbamate

Following the general method of Example 1, 25.0 g. (0.14 M) of 2-(methylamino)isobutyrophenone was reacted with 32.6 g. (0.3 M) of ethyl chloroformate in the presence of aqueous sodium carbonate solution to give ethyl N-(α,α-dimethylphenacyl)-N-methylcarbamate, B.P. 113.5–115° (0.05 mm.), M.P. 58–59.5°.

EXAMPLE 13

Preparation of ethyl N-(α,α-dimethylphenacyl)-N-ethylcarbamate

Following the general procedure of Example 1, 24.4 g. (0.13 M) of 2-(ethylamino)isobutyrophenone was reacted with 27.2 g. (0.25 M) of ethyl chloroformate in the presence of aqueous sodium carbonate solution to give 28.0 g. (84%) ethyl N-(α,α-dimethylphenacyl) - N - ethylcarbamate, B.P. 134–135° (0.16 mm.).

EXAMPLE 14

An illustrative composition for tablets is as follows:

Per tablet, mg.
(a) l - ethyl N - methyl - N - (α - methylphenacyl) carbamate _____ 50
(b) Wheat starch _____ 7.5
(c) Lactose _____ 16.5
(d) Magnesium stearate _____ 1.0

Preparation: A granulation obtained up mixing lactose with the starch and granulated starch paste is dried, screened and mixed with the carbamate into tablets weighing 75 mg. each.

EXAMPLE 15

An illustrative composition for hard gelatin capsules is as follows:

Per capsule, mg.
(a) Ethyl N - (α,α - dimethylphenacyl)carbamate __ 75
(b) Talc _____ 20

The formulation is prepared by passing the dry powders of (a) and (b) through a fine mesh screen and mixing them well. The powder is then filled into suitable sized hard gelatin capsules at a net fill of 95 mg. per capsule.

EXAMPLE 16

The starting material for Example 5, l-ethyl N-methyl-N-(α-methylphenacyl)carbamate was prepared by the following method:

A solution of 42.85 g. (0.1 M) of l-ephedrine sulfate in 250 ml. of water was treated with 500 ml. of 15% sodium carbonate solution and cooled to 10° C. by stirring in an ice bath. To the resulting mixture was added 32.4 g. (0.3 M) of ethyl chloroformate. The reaction mixture was stirred for fifteen minutes, and extracted with two, 300 ml. portions of diethyl ether. The extracts were dried over anhydrous magnesium sulfate, filtered and the ether removed at reduced pressure. The resulting residue was used without further purification in Example 5.

EXAMPLE 17

Anorexigenic effects in mice and rats were determined by the method of Ketteler et al., The Pharmacologist, 9:244 (1967) and by a modification of the method of Spangler and Wäser, Arch. Exp. Pathol. Pharmakol, 237:171–185 (1959), respectively. In the former, frequencies of feeding episodes are recorded for groups of 10 fasted mice given incremental doses of the test compound orally. $ED_{50}$ determinations are based on reduction of feeding episodes in excess of two standard deviations of the mean incidence in control groups. In the latter method, incremental amounts of the test compound are administered orally to groups of 10 rats trained to consume a daily ration of food within a span of 6 hours. $ED_{50}$ determinations are based on reductions of food consumption (in a one-hour period), in excess of two standard deviations of the mean food consumption of controls. Anorectic activity by these methods for two of the compounds of this invention is given below in Table I.

TABLE I

| Item | Structure | $ED_{50}$ (95% confidence limits), mg./kg. p.o. | |
|---|---|---|---|
| | | Mouse | Rat |
| 1 | C₆H₅–C(O)–C(CH₃)(H)–N(CH₃)(CO₂C₂H₅) | 9.9(7.2–13.5) | 8.8(6.2–12.5) |
| 2 | C₆H₅–C(O)–C(CH₃)₂–N(C₂H₅)(CO₂C₂H₅) | 10(5.3–18.8) | 9.1(6.3–13.2) |

Anorexia is the dominant effect of the compounds of this invention. Cardiovascular side effects, as observed with other anoretics, are minimal for the compounds of this invention.

What is claimed is:
1. A compound of the formula

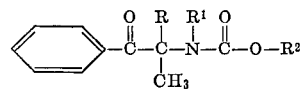

wherein: R is hydrogen or methyl; $R^1$ is hydrogen, methyl, ethyl or isopropyl; and $R^2$ is (lower)alkyl or benzyl.

2. A compound of claim 1 wherein R is hydrogen, $R^1$ is methyl, ethyl or isopropyl and $R^2$ is (lower)alkyl.

3. A compound of claim 2 wherein $R^1$ is ethyl and $R^2$ is ethyl.

4. A compound of claim 2 wherein $R^1$ is methyl and $R^2$ is ethyl.

5. A compound of claim 2 wherein $R^1$ is ethyl and $R^2$ is methyl.

6. A compound of claim 1 wherein R is hydrogen, $R^1$ is hydrogen and $R^2$ is (lower)alkyl.

7. A compound of claim 6 wherein $R^2$ is ethyl.

8. A compound of claim 1 wherein R is methyl, $R^1$ is methyl, ethyl or isopropyl, and $R^2$ is (lower)alkyl.

9. A compound of claim 8 wherein $R^2$ is ethyl.

10. A compound of claim 8 wherein each of $R^1$ and $R^2$ is ethyl.

11. A compound of claim 8 wherein $R^1$ is methyl and $R^2$ is ethyl.

12. A compound of claim 1 wherein R is methyl, $R^1$ is hydrogen and $R^2$ is (lower)alkyl.

13. A compound of claim 12 wherein $R^2$ is ethyl.

14. *l*-Ethyl N-methyl-N-(a-methylphenacyl)carbamate.

References Cited

Slotta, K. H. et al.: Ber., vol. 63 (1930), pp. 1024–1028 cited.

LORRAINE A. WEINBERGER, Primary Examiner

L. A. THAXTON, Assistant Examiner

U.S. Cl. X.R.

424—300